United States Patent
Ungar et al.

(10) Patent No.: US 9,586,675 B2
(45) Date of Patent: Mar. 7, 2017

(54) APPARATUS AND METHOD FOR ARRESTMENT OF A FLIGHT CONTROL SURFACE

(71) Applicant: The Boeing Company, Chicago, IL (US)

(72) Inventors: Lior Ungar, Lynnwood, WA (US); Randall E. Anderson, Stanwood, WA (US); Sergey N. Skobyak, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 416 days.

(21) Appl. No.: 14/299,625

(22) Filed: Jun. 9, 2014

(65) Prior Publication Data

US 2016/0194075 A1    Jul. 7, 2016

(51) Int. Cl.
  *B64C 3/38* (2006.01)
  *B64C 13/28* (2006.01)
  *B64C 13/42* (2006.01)
  *B64C 9/00* (2006.01)
  *F16H 21/44* (2006.01)

(52) U.S. Cl.
  CPC ............ *B64C 13/28* (2013.01); *B64C 9/00* (2013.01); *B64C 13/42* (2013.01); *F16H 21/44* (2013.01)

(58) Field of Classification Search
  None
  See application file for complete search history.

(56) References Cited

U.S. PATENT DOCUMENTS

| | | | |
|---|---|---|---|
| 3,756,089 A * | 9/1973 | Haladay | B64C 13/24 16/367 |
| 3,958,779 A | 5/1976 | Townsend | |
| 4,470,569 A * | 9/1984 | Shaffer | B64C 9/22 244/213 |
| 4,498,647 A * | 2/1985 | Boehringer | B64C 9/02 244/213 |
| 4,858,491 A * | 8/1989 | Shube | B64C 13/42 192/141 |
| 5,035,378 A | 7/1991 | Spanovich | |
| 5,538,209 A * | 7/1996 | Bowden | B64C 13/42 244/221 |
| 5,791,596 A * | 8/1998 | Gautier | B64C 13/42 244/227 |
| 5,823,471 A * | 10/1998 | Dazet | B64C 9/10 244/213 |
| 6,152,692 A * | 11/2000 | Aubry | B64C 27/615 244/17.25 |
| 6,241,182 B1 * | 6/2001 | Durandeau | B64C 13/42 244/227 |

(Continued)

OTHER PUBLICATIONS

Extended European Search Report, EP 15 16 0872 (Oct. 27, 2015).

*Primary Examiner* — Christopher P Ellis
(74) *Attorney, Agent, or Firm* — Walters & Wasylyna LLC

(57) ABSTRACT

A secondary actuation mechanism for arresting movement of a control surface may include a secondary actuator, a drive link coupled to the secondary actuator, and a secondary connecting rod coupled between the drive link and the control surface, wherein the control surface is movable to a default position in response to actuation of the secondary actuator, and the secondary actuator retains the control surface at the default position.

19 Claims, 11 Drawing Sheets

(56) References Cited

U.S. PATENT DOCUMENTS

| | | | | |
|---|---|---|---|---|
| 6,923,405 B2* | 8/2005 | Cline | ............... | B64C 13/42 |
| | | | | 244/195 |
| 7,607,611 B2 | 10/2009 | Wingett et al. | | |
| 8,104,710 B2* | 1/2012 | Harvey | ............... | B64C 13/28 |
| | | | | 244/213 |
| 8,276,842 B2* | 10/2012 | Kracke | ............... | B64C 13/28 |
| | | | | 244/99.2 |
| 8,511,608 B1* | 8/2013 | Good | ............... | B64C 9/16 |
| | | | | 244/214 |
| 9,021,903 B2* | 5/2015 | Elliott | ............... | B64C 13/28 |
| | | | | 244/102 R |
| 2004/0075019 A1* | 4/2004 | Collins | ............... | B64C 13/30 |
| | | | | 244/99.9 |
| 2007/0018040 A1* | 1/2007 | Wingett | ............... | B64C 13/42 |
| | | | | 244/99.4 |
| 2010/0032520 A1* | 2/2010 | Mauran | ............... | B64C 9/02 |
| | | | | 244/99.4 |
| 2010/0116929 A1* | 5/2010 | Hejda | ............... | B64C 13/42 |
| | | | | 244/99.4 |
| 2013/0320137 A1* | 12/2013 | Maenz | ............... | B64C 5/06 |
| | | | | 244/87 |

\* cited by examiner

US 9,586,675 B2

APPARATUS AND METHOD FOR ARRESTMENT OF A FLIGHT CONTROL SURFACE

FIELD

The present disclosure is generally related to aircraft flight control surfaces and, more particularly, to apparatus and methods for arresting free movement of flight control surfaces.

BACKGROUND

Modern aircraft include various flight control surfaces that allow a pilot to adjust and control the aircraft's flight attitude. Control surfaces are movably connected to the aircraft (e.g., to the wing). Movement (e.g., up/down or left/right movement) of the flight control surfaces may control, for example, the speed, lift, roll, pitch, and/or yaw of the aircraft. Movement (e.g., up/down or left/right movement) of the flight control surfaces may control, for example, fuel consumption of the aircraft by adjusting the wing for an optimal coefficient of drag.

Typically, an actuation mechanism (e.g., an electromechanical or hydraulic actuator) is operably coupled to the control surface to control the movement of the control surface. However, a failure of the primary actuation mechanism may lead to free movement of the control surface of the aircraft. Free movement of the control surface may create uncontrollable flight conditions that could lead to a potentially catastrophic event.

One solution to prevent potential actuation mechanism failure leading to freely moving control surfaces may include providing one or more additional (e.g., dual) actuators coupled to the control surface. However, adding additional actuators may increase the weight of the aircraft and the complexity of the control surface systems. Another solution may include providing additional stiffness to the actuation mechanisms (e.g., connecting rods). However, stiffening the actuation mechanism may increase the load demand leading to increased actuator size and system power demands. Furthermore, the limited space available may present problems in the implementation of either solution.

Accordingly, those skilled in the art continue with research and development efforts in the field of flight control surfaces and, more particularly, to the arrestment of freely moving flight control surfaces.

SUMMARY

In one embodiment, the disclosed secondary actuation mechanism for arresting movement of a control surface may include a secondary actuator, a drive link coupled to the secondary actuator, and a secondary connecting rod coupled between the drive link and the control surface, wherein the control surface is movable to a default position in response to actuation of the secondary actuator, and the secondary actuator retains the control surface at the default position.

In another embodiment, the disclosed aircraft may include at least one control surface, a primary actuation mechanism coupled to the control surface, and a secondary actuation mechanism coupled to the control surface, wherein the control surface is movable between a first position and a second position in response to actuation of the primary actuation mechanism, the control surface is movable to a default position in response to actuation of the secondary actuation mechanism, the secondary actuation mechanism actuates in response to a failure of the primary actuation mechanism, and the secondary actuator retains the control surface at the default position.

In yet another embodiment, the disclosed method for arresting movement of a control surface may include the steps of: (1) coupling a secondary actuation mechanism to the control surface, (2) actuating the secondary actuation mechanism in response to a failure of a primary actuation mechanism, the primary actuation mechanism controlling movement of the control surface, (3) causing, by the secondary actuation mechanism, the control surface to move to a default position in response to actuation of the secondary actuation mechanism, and (4) arresting, by the secondary actuation mechanism, movement of the control surface.

Other embodiments of the disclosed aircraft, secondary actuation mechanism, and method will become apparent from the following detailed description, the accompanying drawings and the appended claims.

DETAILED DESCRIPTION

Figure 1:
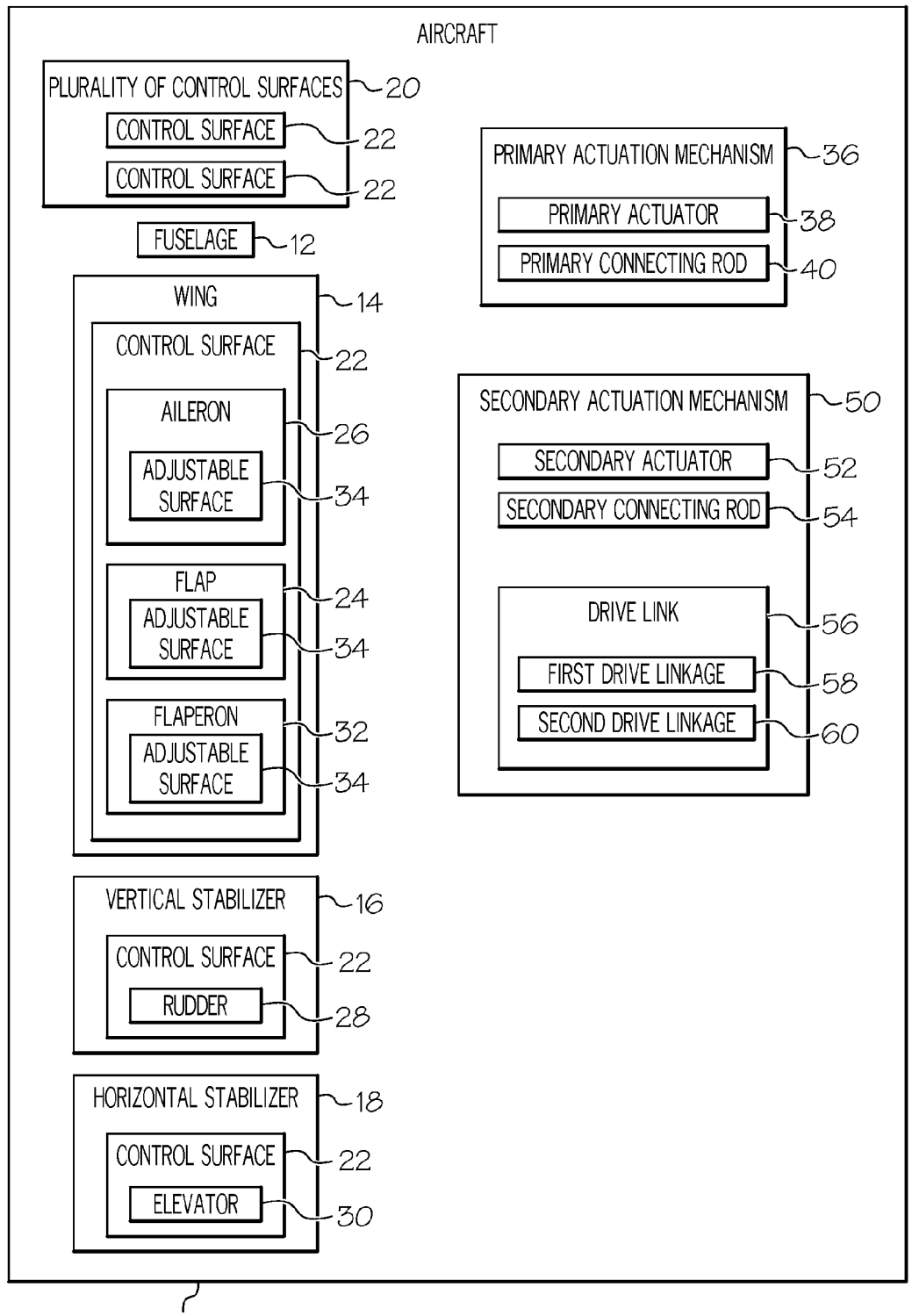
FIG. 1 is a block diagram of one embodiment of the disclosed aircraft.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
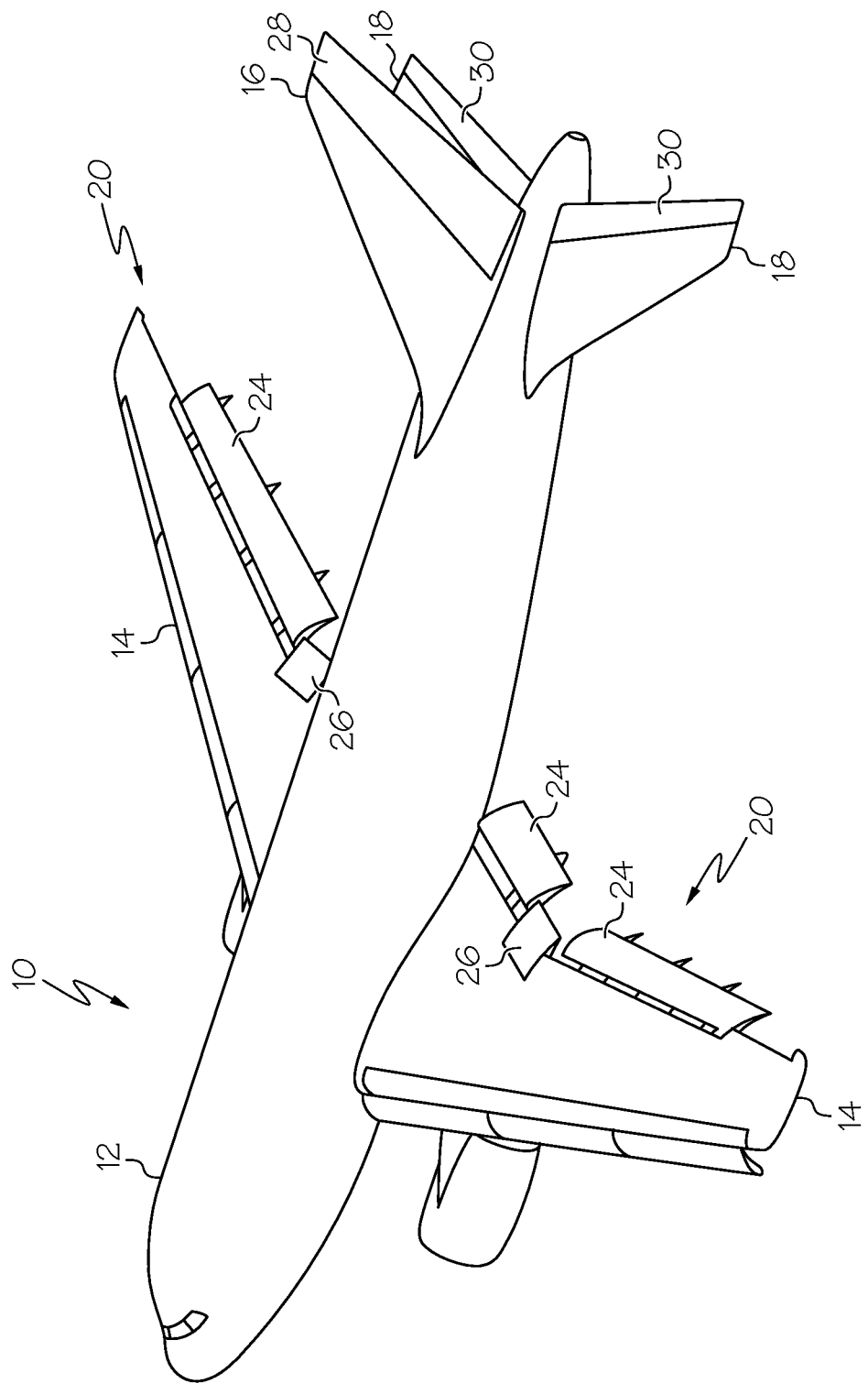
FIG. 2 is a schematic perspective view of one embodiment of the aircraft of FIG. 1.

Referring to FIGS. 1 and 2, one embodiment of the disclosed aircraft, generally designated 10, may include a plurality of control surfaces 20. Each control surface 22

(FIG. 1) of the plurality of control surfaces 20 may be any flight control surface that is adjustable (e.g., movable) to control one or more flight characteristics (e.g., attitude, fuel consumption, drag, etc.) of the aircraft 10. As one example, the aircraft 10 may be a fixed wing aircraft and may include a fuselage 12 and a pair of wings 14. Each wing 14 may extend outward from the fuselage 12. The aircraft 10 may also include a vertical stabilizer 16 and a pair of horizontal stabilizers 18 extending outward from the fuselage 12.

Referring to FIG. 1, in one embodiment, the aircraft 10 may include at least one primary actuation mechanism 36 coupled to the control surface 22. The control surface 22 may be movably (e.g., hingedly) connected the aircraft 10. The primary actuation mechanism 36 may control motion of the control surface 22. As one example, the primary actuation mechanism 36 may include a primary actuator 38 and a primary connecting rod 40. The primary connecting rod 40 may be coupled between the primary actuator 38 and the control surface 22.

Referring to FIGS. 1 and 2, in one embodiment, each wing 14 may include one or more control surfaces 22 of the plurality of control surfaces 20. Each control surface 22 may move with respect to the wing 14. The primary actuation mechanism 36 may control movement and/or the position of the control surface 22 with respect to the wing 14. As one example, the control surfaces 22 may include a flap 24. The flap 24 may be pivotally (e.g., hingedly) connected to the wing 14 and may include an up and down motion controlled by the primary actuation mechanism 36 (FIG. 1). As one example, the control surfaces 22 may include an aileron 26. The aileron 26 may be pivotally (e.g., hingedly) connected to the wing 14 and may include an up and down motion controlled by the primary actuation mechanism 36. As one example, the control surfaces 22 may include a flaperon 32 (FIG. 1). The flaperon 32 (e.g., a combination flap 24 and aileron 26) may be pivotally (e.g., hingedly) connected to the wing 14 and may include an up and down motion controlled by the primary actuation mechanism 36.

In one embodiment, the vertical stabilizer 16 may include one or more control surfaces 22 of the plurality of control surfaces 20. Each control surface 22 may move with respect to the vertical stabilizer 16. The primary actuation mechanism 36 may control movement and/or the position of the control surface 22 with respect to the vertical stabilizer 16. As one example, the control surface 22 may include a rudder 28. The rudder 28 may be pivotally (e.g., hingedly) connected to the vertical stabilizer 16 and may include a left and right motion controlled by the primary actuation mechanism 36.

In one embodiment, each horizontal stabilizer 18 may include one or more control surfaces 22 of the plurality of control surfaces 20. Each control surface 22 may move with respect to the horizontal stabilizer 18. The primary actuation mechanism 36 may control movement and/or the position of the control surface 22 with respect to the horizontal stabilizer 18. As one example, the control surfaces 22 may include an elevator 30. The elevator 30 may be pivotally (e.g., hingedly) connected to the horizontal stabilizer 18 and may include an up and down motion controlled by the primary actuation mechanism 36.

Figure 3:
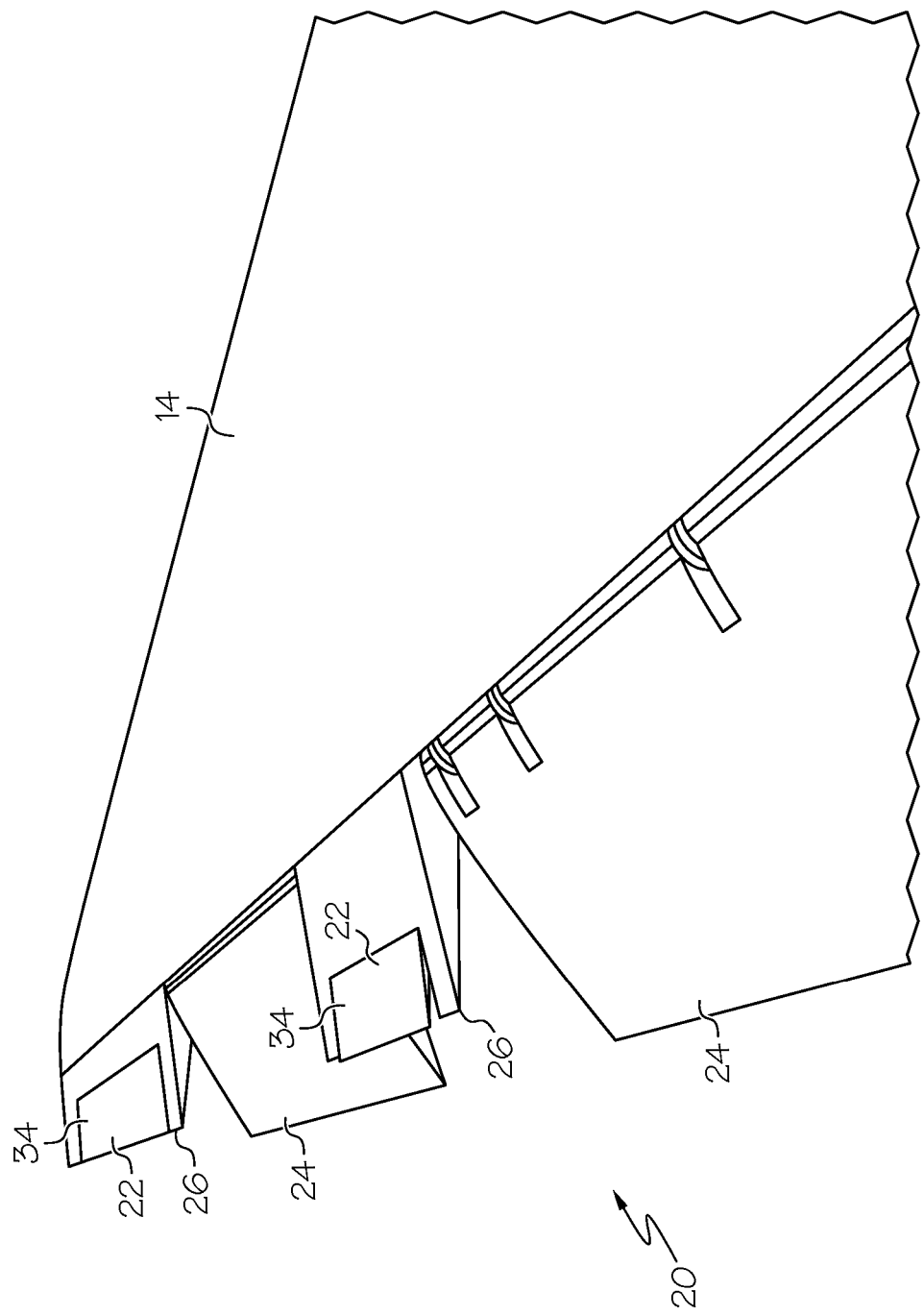
FIG. 3 is a partial schematic perspective view of one embodiment of the wing of FIG. 1.

Referring to FIGS. 1 and 3, in one embodiment, the aileron 26 may include one or more the control surfaces 22. Each control surface 22 may move with respect to the aileron 26. The primary actuation mechanism 36 may control movement and/or the position of the control surface 22 with respect to the aileron 26. As one example, the control surface 22 may include an adjustable surface 34 of the aileron 26. The adjustable surface 34 may be pivotally (e.g., hingedly) connected to the aileron 26 and may include an up and down motion controlled by the primary actuation mechanism 36.

Those skilled in the art will recognize that other control surfaces 22 (e.g., the flap 24 and/or the flaperon 32) may also include one or more adjustable surfaces 34. As one example, the adjustable surface 34 may be pivotally (e.g., hingedly) connected to the flap 24 and/or the flaperon 32 and may include an up and down motion controlled by the primary actuation mechanism 36.

Referring to FIG. 1, one embodiment, the aircraft 10 may include the disclosed secondary actuation mechanism, generally designated 50, for arresting movement of a control surface. The secondary actuation mechanism 50 may be coupled to the control surface 22 to arrest (e.g., bring to a stop) free motion of the control surface 22 following a failure of the aircraft 10, such as a failure of the primary actuation mechanism 36 or other control systems. As one example, the secondary actuation mechanism 50 may include a secondary actuator 52, a secondary connecting rod 54, and a drive link 56. The drive link 56 may be coupled to the secondary actuator 52. The secondary connecting rod 54 may be coupled between the drive link 56 and the control surface 22.

To simplify understanding of the disclosed secondary actuation mechanism 50 described herein, description may be limited to a single control surface 22, specifically the adjustable surface 34 of the aileron 26. Those skilled in the art will recognize that the secondary actuation mechanism 50 may be amenable for use on other portions of the aircraft 10 (e.g., the wing 14, the vertical stabilizer 16, and/or the horizontal stabilizer 18) and may be modified for use on those other portions and with different types of control surfaces 22 (e.g., the flap 24, the rudder 28, and/or the elevator 30) while remaining within the scope of the present disclosure. Furthermore, while the disclosed secondary actuation mechanism 50 may be described with reference to the control surface 22 being provided on a fixed winged aircraft, those skilled in the art will recognize that the disclosed secondary actuation mechanism 50 may be amenable for use with other types of aircraft, as well as with land and/or water vehicles.

Figure 4:
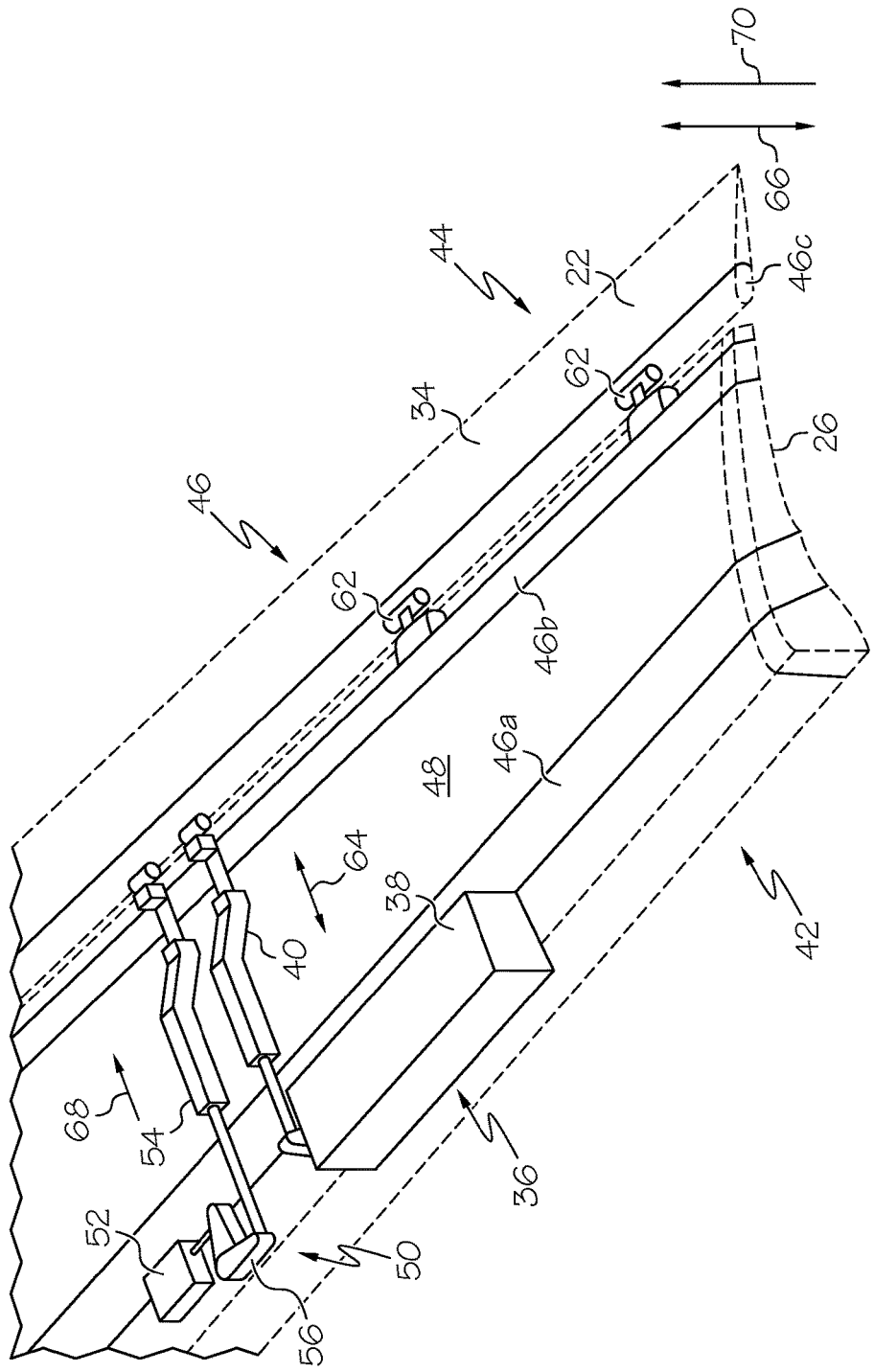
FIG. 4 is a partial schematic perspective view one embodiment of the aileron of FIG. 1.

Referring to FIG. 4, in one embodiment, the aileron 26 may include a leading edge 42, a trailing edge 44, and an exterior surface 48 extending between the leading edge 42 and the trailing edge 44. In FIG. 4, the exterior surfaces 48 of the aileron 26 and the adjustable surface 34 are represented as being transparent for clarity (the aileron 26 and the adjustable surface 34 are depicted by broken lines). As one example, the adjustable surface 34 (e.g., the control surface 22) may define at least a portion of the exterior surface 48 of the aileron 26.

In one embodiment, the aileron 26 may include a plurality of spars 46 defining an internal support structural of the aileron 26 and/or the adjustable surface 34. As one example, the aileron 26 may include at least a front spar 46a positioned proximate (e.g., at or near) the leading edge 42 and a rear spar 46b positioned proximate the trailing edge 44.

In one embodiment, the adjustable surface 34 (e.g., the control surface 22) may be movably (e.g., pivotally) connected to the aileron 26 proximate (e.g., at or near) the trailing edge 44 of the aileron 26. As one example, the aileron 34 may be hingedly connected to the rear spar 46b. As one example, the adjustable surface 34 may include an adjustable spar 46c defining the internal support structure of the adjustable surface 34. As one example, the adjustable surface 34 of the aileron 26 may be a trim tab.

In one embodiment, a plurality of hinged connections 62 may hingedly interconnect the adjustable surface 34 to the aileron 26. As one example, the plurality of hinged connections 62 may hingedly interconnect the adjustable spar 46c to the rear spar 46b.

In one embodiment, the primary actuation mechanism 36 may be operably coupled between the aileron 26 and the adjustable surface 34. As one example, the primary actuator 38 may be connected to a spar 46 (e.g., the front spar 46a) of the aileron 26. The primary connecting rod 40 may be operably interconnected between the primary actuator 38 and a spar 46 (e.g., the adjustable spar 46c) of the adjustable surface 34.

Actuation of the primary actuator 38 may cause reciprocal (e.g., back and forth) linear motion of the primary connecting rod 40, for example, in a linear direction illustrated by directional arrow 64. The reciprocal linear motion of the primary connecting rod 40 may cause an up and down motion of the adjustable surface 34 (e.g., the control surface 22), for example, in a direction illustrated by directional arrow 66.

In one embodiment, the primary actuator 38 may move the primary connecting rod 40 between a first (e.g., rearward-most) position and a second (e.g., forward-most) position to move the adjustable surface 34 (e.g., the control surface 22) between a first (e.g., upward-most) position and a second (e.g., downward-most) position. As one example, movement of the primary connecting rod 40 to the first position (e.g., rearward-most) may cause movement of the adjustable surface 34 to the first (e.g., upward-most) position. As one example, movement of the primary connecting rod 40 to the second (e.g., forward-most) position may cause movement of the adjustable surface 34 to the second (e.g., downward-most) position. As one example, movement of the primary connecting rod 40 to an intermediate position (e.g., a position between the first and second positions) may cause movement of the adjustable surface 34 to an intermediate position (e.g., a position between the first and second positions).

Unless otherwise indicated, the terms "first," "second," "third," "fourth," etc. are used herein merely as labels, and are not intended to impose ordinal, positional, or hierarchical requirements on the items to which these terms refer.

Those skilled in the art will recognize that movement of the control surface 22 between the first (e.g., upward-most) and second (e.g., downward-most) positions may control one or more characteristics of the flight attitude of the aircraft 10 (FIG. 2). As one example, movement of the adjustable surface 34 of the aileron 26 may control the roll of the aircraft 10 (e.g., movement around the aircraft's longitudinal axis). As one example, movement of the adjustable surface 34 may define the trimming of the wing 14, influence the fuel consumption of the aircraft 10, and/or optimize (e.g., drop) the coefficient of drag on the wing 14.

Those skilled in the art will recognize that the primary connecting rod 40 may be substantially straight or may include one or more bends to accommodate interconnection between the primary actuator 38 and the control surface 22 (e.g., the adjustable surface 34). Those skilled in the art will also recognize that the shape of the primary connecting rod 40 may depend on various factors including, but not limited to, the shape of the aileron 26, the location of the control surface 22 (e.g., the adjustable surface 34) relative to the aileron 26 (e.g., the position of the adjustable spar 46c relative to the front spar 46a), the amount of space available within the aileron 26, and the like.

In one embodiment, the secondary actuation mechanism 50 may be operably coupled between the aileron 26 and the adjustable surface 34. As one example, the secondary actuator 52 may be connected to the spar 46 (e.g., the front spar 46a) of the aileron 26. The drive link 56 may be operably connected to the secondary actuator 52. The secondary connecting rod 54 may be operably interconnected between the drive link 56 and the spar 46 (e.g., the adjustable spar 46c) of the adjustable surface 34 (e.g., the control surface 22).

Actuation of the secondary actuator 52 may cause unidirectional (e.g., in a single direction) linear motion of the secondary connecting rod 54, for example, in a single linear direction illustrated by directional arrow 68. The unidirectional linear motion of the primary connecting rod 40 (a rearward motion is illustrated in FIG. 4) may cause an up or down motion (an upward motion is illustrated in FIG. 4) of the adjustable surface 34 (e.g., the control surface 22), for example, in a direction illustrated by directional arrow 70.

In one embodiment, the secondary actuator 50 may move the secondary connecting rod 54 from a first (e.g., start) position to a second (e.g., end) position to move the adjustable surface 34 (e.g., the control surface 22) to a default position (e.g., to one of the first position or the second position of the control surface 22). As one example, movement of the secondary connecting rod 54 to the second position may cause movement of the adjustable surface 34 to the first (e.g., upward-most) position. As one example, movement of the secondary connecting rod 54 to the second position may cause movement of the adjustable surface 34 to the second (e.g., downward-most) position.

Once the secondary connecting rod 54 is moved to the second position by the secondary actuator 56, the secondary actuator 56 may retain (e.g., lock) the secondary connecting rod 54 in the default position (e.g., the first or second position of the control surface 22) and prevent movement of the secondary connecting rod 54 back toward the first position of the secondary connecting rod 54. Thus, when the secondary connecting rod 54 is moved to the second (e.g., end) position by the secondary actuator 52, the adjustable surface 34 (e.g., the control surface 22) may be retained in the default position (e.g., at one of the first or second positions) and the secondary connecting rod 54 may arrest movement of the adjustable surface 34.

Figure 5:
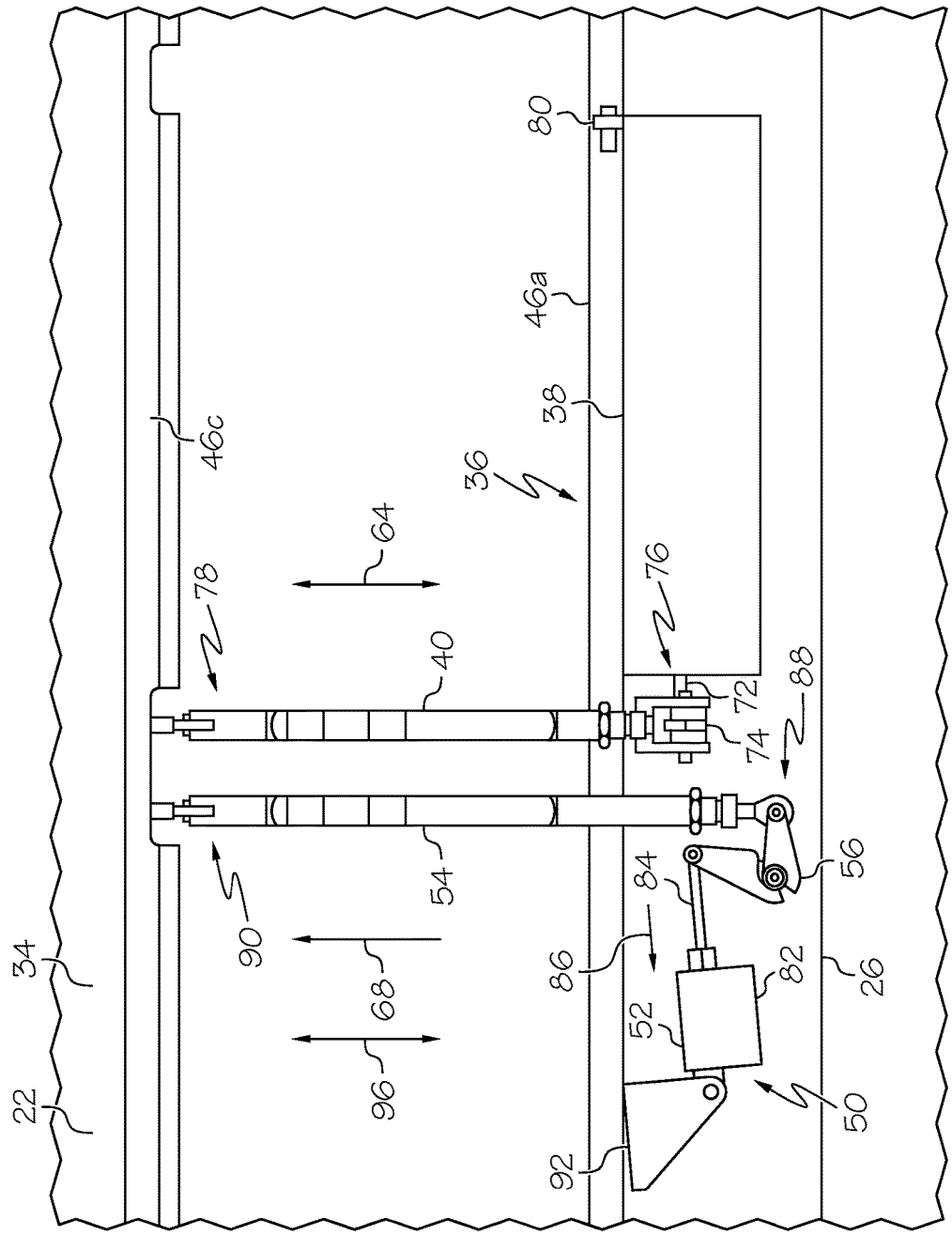
FIG. 5 is a schematic plan view one embodiment of the primary actuation mechanism for controlling a control surface and the secondary actuation mechanism for arresting movement of a control surface of FIG. 1.
Figure 6:
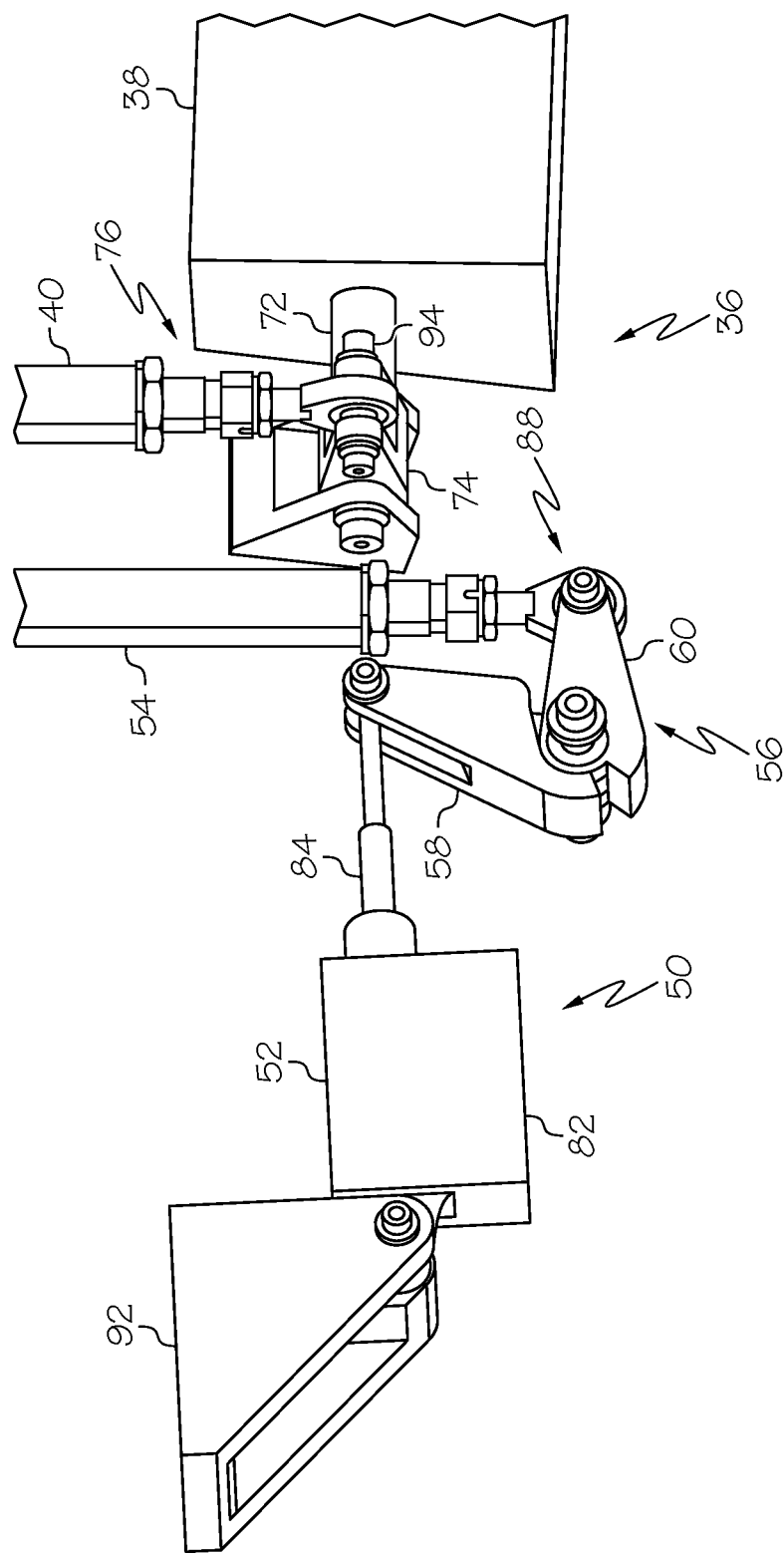
FIG. 6 is a schematic perspective view of the primary actuation mechanism and the secondary actuation mechanism of FIG. 5.

Referring to FIGS. 5 and 6, in one embodiment, the primary actuator 38 may include a rotary actuator that produces a rotary motion. As one general, non-limiting example, the primary actuator 38 may include an electromechanical actuator (e.g., an electronic motor actuator or a hydraulic actuator disposed within an exterior housing). The primary actuator 38 may include a crankshaft 72 operably connected to and extending outward from the primary actuator 38. A crank 74 may be operably connected to an end of the crankshaft 72. As one example, the crank 74 may be a bell crank. As one example, the primary actuator 38 may produce a rotary motion of the crankshaft 72. The primary actuator 38 may be connected to the aileron 26 (e.g., to the front spar 46a) by a primary actuator bracket 80.

In one embodiment, the primary connecting rod 40 may include a first end 76 and a second end 78 opposite the first end 76 (FIG. 5). As one example, the first end 76 of the primary connecting rod 40 may be operably (e.g., pivotally) connected to the crankshaft 74, for example, by a crank pin 94 (FIG. 6). The crankshaft 74 may translate the rotary motion of the crankshaft 72 into linear motion of the primary connecting rod 40 (e.g., in the direction illustrated by directional arrow 64). The second end 78 of the primary connecting rod 40 may be operably (e.g., pivotally) connected to the adjustable surface 34 (e.g., the control surface 22), for example, to the adjustable spar 46c of the adjustable surface 34.

In one embodiment, the secondary actuator 52 may include a retracting actuator (e.g., in inwardly driving actuator). As one example, the secondary actuator 52 may include a pyrotechnic actuator. In general, the secondary actuator 52 may include an actuator housing 82 in which a pyrotechnic pressure element or cartridge (not shown) is arranged and an actuator element 84 (e.g., a piston) extending from the actuator housing 82. The secondary actuator 52 may be connected to the aileron 26 (e.g., to the front spar 46a) by a secondary actuator bracket 92.

In general, the pyrotechnic pressure element may be held by a pressure element carrier (not shown) within the actuator housing 82. An ignitable chemical substance (not shown) may be contained in the pyrotechnic pressure element and may be brought to reaction by triggering the pyrotechnic pressure element, for example, by electrical or mechanical energy. The pyrotechnic pressure element may also be known as a pyrotechnic igniter in the case of an electrical energy activation. Pyrotechnic pressure elements of this type and suitable ignition mechanisms (e.g., charging elements) are known in the art.

As one example, the pyrotechnic pressure element may serve to actuate the actuator element 24. Activation of the pyrotechnic pressure element may trigger a conversion of the ignitable chemical substance, which results in the generation of a gas pressure impulse. As one example, upon actuation of the secondary actuator 52, the gas pressure impulse may be created in the pyrotechnic pressure element by a fast conversion of the ignitable chemical substance, which, for example, may open a cylindrical sleeve (not shown) of the pressure element. When the pyrotechnic pressure element is ignited, a gas pressure may be built up in the pyrotechnic pressure element by the reaction of the ignitable chemical substance located in the pyrotechnic pressure element, which, for example, may result in an opening of a sleeve (not shown) of the pyrotechnic pressure element. The created gas pressure may flow out of the pyrotechnic pressure element, for example, through an opening of the sleeve and build up a gas pressure in a space bounded by the pyrotechnic pressure element or the pressure element carrier.

The actuator element 84 may be moved relative to the actuator housing 82 (e.g., is pulled into it) in response to the gas pressure built up within the pyrotechnic pressure element. The actuator element 84 may include the shape of a piston, which may be displaceably supported in an axial direction in the actuator housing 82. Since the action on the actuator element 84 takes place very abruptly but in a controlled manner, the actuator element 84 may be moved in a short time from a first (e.g., start) position into a second (e.g., end) position, for example, in the direction illustrated by directional arrow 86 (FIG. 5).

Figure 8:
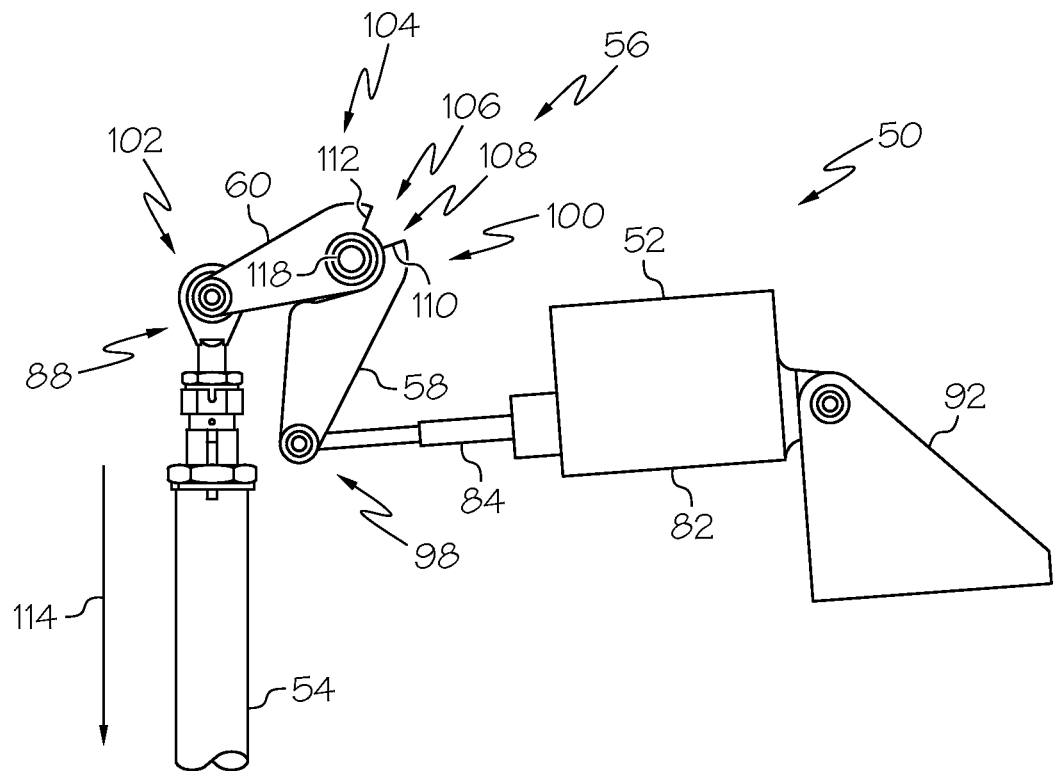
FIG. 8 is a schematic plan view of the secondary actuation mechanism of FIG. 7 depicting the secondary connecting rod in a third (e.g., rearward-most) position.
Figure 9:
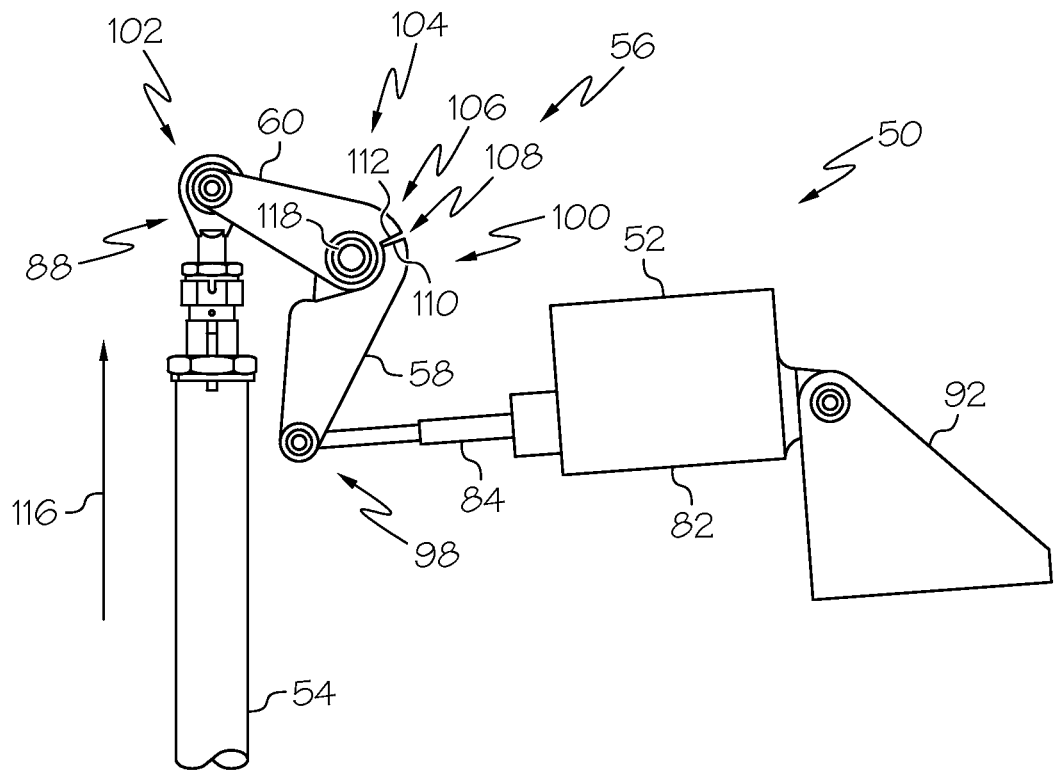
FIG. 9 is a schematic plan view of the secondary actuation mechanism of FIG. 7 depicting the secondary connecting rod in a fourth (e.g., forward-most) position.
Figure 10:
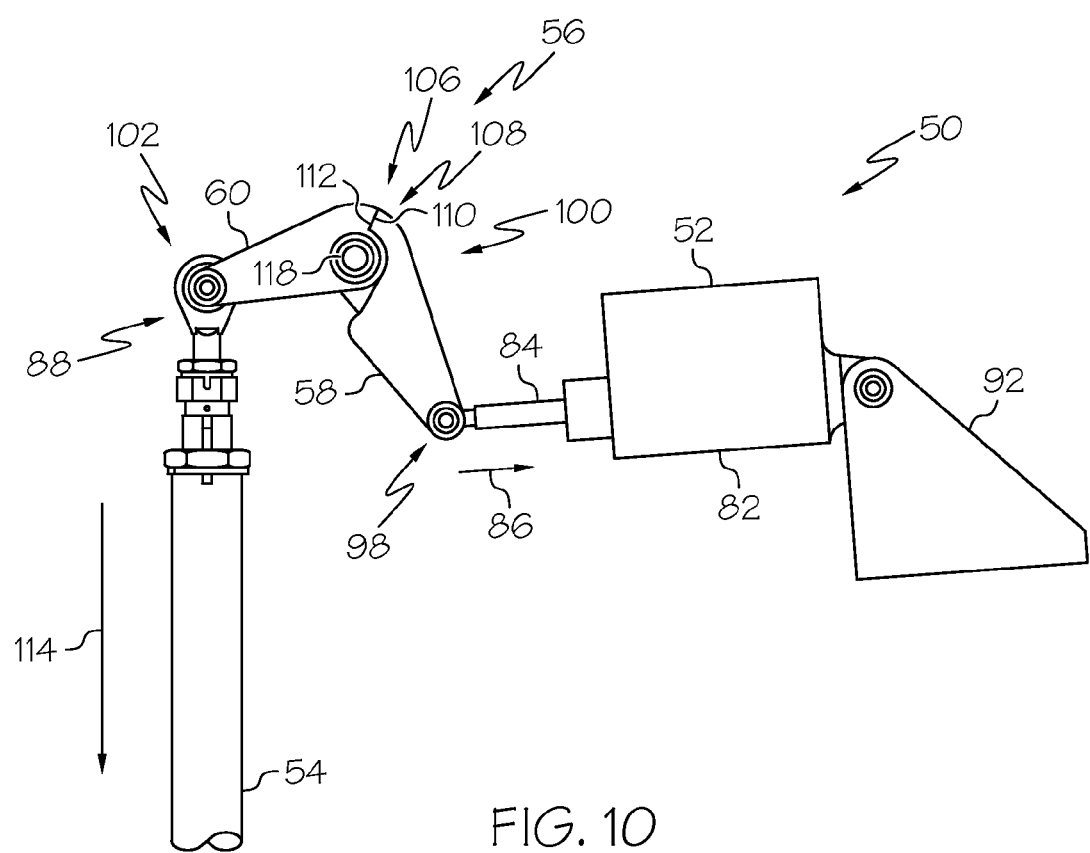
FIG. 10 is a schematic plan view of the secondary actuation mechanism of FIG. 7 depicting the actuation element in a second (e.g., end) position and the secondary connecting rod in a second (e.g., end) position.

The secondary actuator 52 (e.g., the actuator housing 82) may include a latching mechanism (not shown) that locks the actuator element 84 at the end of its stroke (e.g., an end position, as illustrated in FIG. 10). The latching mechanism may be released (e.g., manually released) to allow the actuator element 84 to return to an original stroke position (e.g., a start position as illustrated in FIGS. 8 and 9.)

Advantageously, the secondary actuator 52 may provide fast power development. Furthermore, the energy required to move the actuator element 84 may be stored without pressure over a long period of time by the ignitable chemical substances and may be released with comparatively small electrical or mechanical energy. Additionally, the reaction of the ignitable chemical substance may occur and be contained completely within the actuator housing 82. Thus, implementation of the disclosed secondary actuation mechanism 50 as a means to arrest movement of the control surface 22 may minimize both space and power demands.

In one embodiment, the secondary connecting rod 54 may include a first end 88 and a second end 90 opposite the first end 88 (FIG. 5). As one example, the first end 88 of the secondary connecting rod 54 may be operably (pivotally) connected to the drive link 56. The drive link 56 may be operably (e.g., pivotally) connected to an end of the actuator element 84. The drive link 56 may translate the linear motion of the actuator element 84 (e.g., in the direction illustrated by directional arrow 86) into linear motion of the secondary connecting rod 54 (e.g., in the direction illustrated by directional arrow 68). The second end 78 of the secondary connecting rod 54 may be operably (e.g., pivotally) connected to the adjustable surface 34 (e.g., the control surface 22), for example, to the adjustable spar 46c of the adjustable surface 34.

Referring to FIG. 5, since both the primary connecting rod 40 and the secondary connecting rod 54 are operably connected to the adjustable surface 34 (e.g., the control surface 22), reciprocal linear motion (e.g., in the direction illustrated by directional arrow 64) of the primary connecting rod 40 may cause reciprocal linear motion (e.g., in the direction illustrated by directional arrow 96) of the secondary connecting rod 54. As one example, movement of the primary connecting rod 40 to the first (e.g., rearward-most) position may cause movement of the secondary connecting rod 54 to a third position (e.g., rearward-most) position. As one example, movement of the primary connecting rod 40 to the second (e.g., forward-most) position may cause movement of the secondary connecting rod 54 to a fourth (e.g., forward-most) position. As one example, movement of the primary connecting rod 40 to an intermediate position (e.g., a position between the first and second positions) may cause movement of the secondary connecting rod 54 to an intermediate position (e.g., a position between the first and second positions). Thus, the secondary actuation mechanism 50 may have no effect on the normal operation of the primary actuation mechanism 36 to control the motion and/or position of the control surface 22.

In one example implementation, the first (e.g., start) position of the secondary control rod 54 and the third (e.g., forward-most) position of the secondary connecting rod 54 may be the same position. In one example implementation, the first (e.g., start) position of the secondary control rod 54 and the third (e.g., forward-most) position of the secondary connecting rod 54 may be different positions (e.g., the third position may be more or less forward than the first position). In one example implementation, the second (e.g., end) position of the secondary control rod 54 and the fourth (e.g., rearward-most) position of the secondary connecting rod 54 may be the same position. In one example implementation, the second (e.g., end) position of the secondary control rod 54 and the fourth (e.g., rearward-most) position of the secondary connecting rod 54 may be different positions (e.g., the second position may be more or less rearward than the fourth position).

In one embodiment, the drive link 56 may be configured to allow for the reciprocal linear motion (e.g., in the direction illustrated by directional arrow 96) of the secondary connecting rod 54 in response to the reciprocal motion (e.g., in the direction illustrated by directional arrow 64) of the primary connecting rod 40 without applying a load to the primary actuation mechanism 36 or a backpressure (e.g., a back-driving force) on the secondary actuator 52 (e.g., without applying a back-driving force upon the actuator element 84 to back-drive the actuator element 84 into the actuator housing 82).

Figure 7:
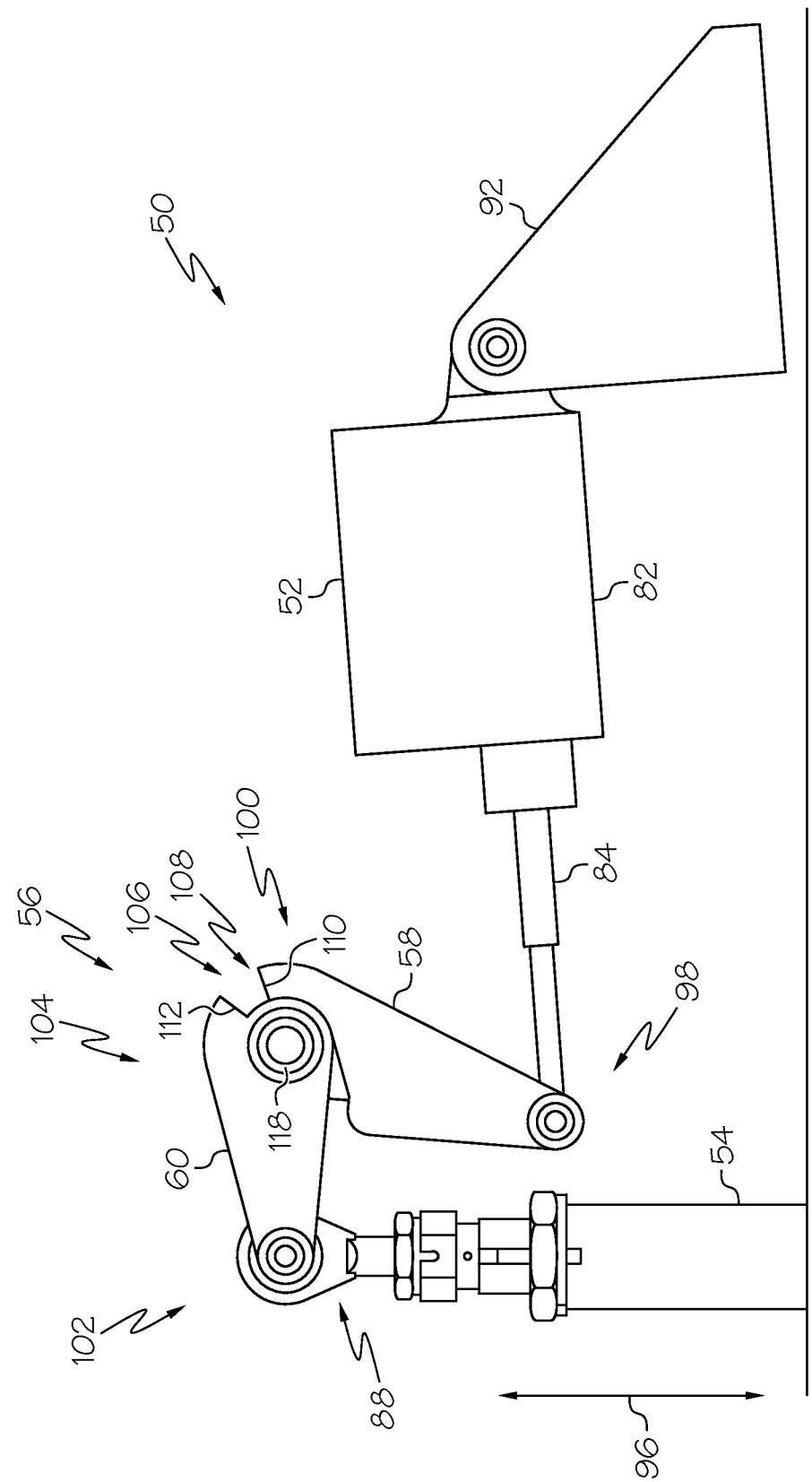
FIG. 7 is a schematic plan view of the secondary actuation mechanism of FIG. 5.

Referring to FIG. 7, in one embodiment, the drive link 56 may include a first drive linkage 58 and a second drive linkage 60. The first drive link 58 and the second drive link 60 may be operably connected together to allow for motion of the second drive linkage 60 relative to the first drive linkage 58 in response to the reciprocal motion of the secondary connecting rod 56 (e.g., in the direction illustrated by directional arrow 96). The first drive linkage 58 may be operably connected to the actuation element 84. The second drive linkage 60 may be operably connected to the first drive linkage 58.

As one example, the first drive linkage 58 may include a first end 98 and a second end 100 opposite the first end 98. The second drive linkage 60 may include a first end 102 and a second end 104 opposite the first end 102. The first end 98 of the first drive linkage 58 may be pivotally connected to the end of the actuation element 84 at an axial pivot connection (e.g., a pin). The first end 102 of the second drive linkage 60 may be pivotally connected to the first end 88 of the secondary connecting rod 54 at an axial pivot connection (e.g., a pin). The second end 100 of the first drive linkage 58 and the second end 104 of the second drive linkage 60 may be pivotally connected together at an axial pivot connection 118 (e.g., a pin).

In one embodiment, the position of the axial pivot connection 118 between the first drive linkage 58 and the second drive linkage 60 may be fixed. As one example, the axial pivot connection 118 (e.g., the pin) pivotally connecting the first drive linkage 58 and the second drive linkage 60 may also be fixed to the aileron 26 (e.g., FIG. 5), for example, to the front spar 46a.

Thus, the second drive linkage 60 may move (e.g., pivot about the axial pivot connection 118) between a first (e.g., rearward-most) position and a second (e.g., forward-most) position relative to the first drive linkage 58 in response to the reciprocal motion of the secondary connecting rod 56 between the third (e.g., rearward-most) position and the fourth (e.g., forward-most) position of the secondary connecting rod 54 (e.g., in the direction illustrated by directional arrow 96) without moving the first drive linkage 58 or without back-driving the actuator element 84 into the actuator housing 82.

In one embodiment, the drive link 56 may include a motion control feature 106. The motion control feature 106 may be configured to allow motion of the second drive linkage 60 relative to the first drive linkage 58 in response to the reciprocal motion of the secondary connecting rod 56. As one example, the motion control feature 106 may include a space (e.g., a gap) 108 defined between the second end 100 of the first drive linkage 58 and the second end 104 of the second drive linkage 60. As one example, the first drive linkage 58 may include a first edge (or corner) 110 proximate the second end 100. The second drive linkage 60 may include a second edge (or corner) 112 proximate the second end 104. The space 108 may be defined between the first edge 110 and the second edge 112.

Referring to FIGS. 5 and 8, as one example, movement of the primary connecting rod 40 to the first (e.g., rearward-most) position (e.g., in the direction illustrated by directional arrow 64), may cause the secondary connecting rod 54 to move to the third (e.g., rearward-most) position, for example, in the direction illustrated by directional arrow 114. Movement of the secondary connecting rod 54 to the third position may cause the second drive linkage 60 to move (e.g., pivot) relative to the first drive linkage 58 to the first (e.g., rearward-most) position and, thus, increasing the size of the space 108, as illustrated in FIG. 8.

Referring to FIGS. 5 and 9, as one example, movement of the primary connecting rod 40 to the second (e.g., forward-most) position (e.g., in the direction illustrated by directional arrow 64), may cause the secondary connecting rod 54 to move to the fourth (e.g., forward-most) position, for example, in the direction illustrated by directional arrow 116. Movement of the secondary connecting rod 54 to the fourth position may cause the second drive linkage 60 to move (e.g., pivot) relative to the first drive linkage 58 to the second (e.g., forward-most) position, and, thus, decreasing the size of the space 108, as illustrated in FIG. 9.

Thus, the size (e.g., the dimension) of the space 108 may be greater than the stroke distance of the secondary connecting rod 54 (e.g., the linear distance the secondary connecting rod 54 moves between the third and fourth positions) in response to the reciprocal motion of the primary connecting rod 40 (FIG. 5). The dimension of the space 108 may be defined as the angular distance between the first edge 110 and the second edge 112.

Referring to FIG. 10, in one embodiment, the drive link 56 may move the secondary connecting rod 54 to the second (e.g., end) position (e.g., in the direction illustrated by directional arrow 114) to arrest movement of the control surface 22 (e.g., the adjustable surface 34) in response to a failure of the primary actuation mechanism 36 (FIG. 5).

In one embodiment, movement of the actuation element 84 from the first (e.g., start) position to the second (e.g., end) position may cause the first drive linkage 58 to move between a first (e.g., start) position and a second (e.g., end) position. During normal operation of the primary actuation mechanism 36 (FIG. 5), the actuation element 84 may remain in the first position and the first drive linkage 58 may remain in the first position. Upon actuation of the secondary actuator 52 (e.g., in response to a failure of the primary actuation mechanism 36), the actuation element 84 may move (e.g., in the direction illustrated by directional arrow 86) to the second position, thus, moving the first drive linkage 58 to the second position.

In one embodiment, movement of the first drive linkage 58 to the second (e.g., end) position may cause movement of the second drive linkage 60 from a third (e.g., start) position to a fourth (e.g., end) position. In one example implementation, the fourth (e.g., end) position of the second drive linkage 60 and the first (e.g., rearward-most) position of the second drive linkage 60 may be the same position.

In one embodiment, the motion control feature 106 may drive movement of the second drive linkage 60 from the third (e.g., start) position to the fourth (e.g., end) position in response to movement of the first drive linkage 58 from the first (e.g., start) position to the second (e.g., end) position. As one example, movement of the first drive linkage 58 to the second (e.g., end) position may close the space 108 such that the first edge 110 of the first drive linkage 58 contacts the second edge 112 of the second drive linkage 60 and may cause the second drive linkage 60 to move to the fourth (e.g., end) position, thus, moving the secondary connecting rod 54 to the second (e.g., end) position and the control surface 22 (e.g., the adjustable surface 34) to the default position (e.g., at one of the first (e.g., upward-most) position or the second (e.g., downward-most) position.

Since the second actuator 52 is a unidirectional actuator, the actuation element 84 may be retained in the second (e.g., end) position following actuation, thus, retaining the secondary connecting rod 54 in the second (e.g., end) position and the control surface 22 (e.g., the adjustable surface 34) in the default position to arrest free movement of the control surface 22.

Figure 11:
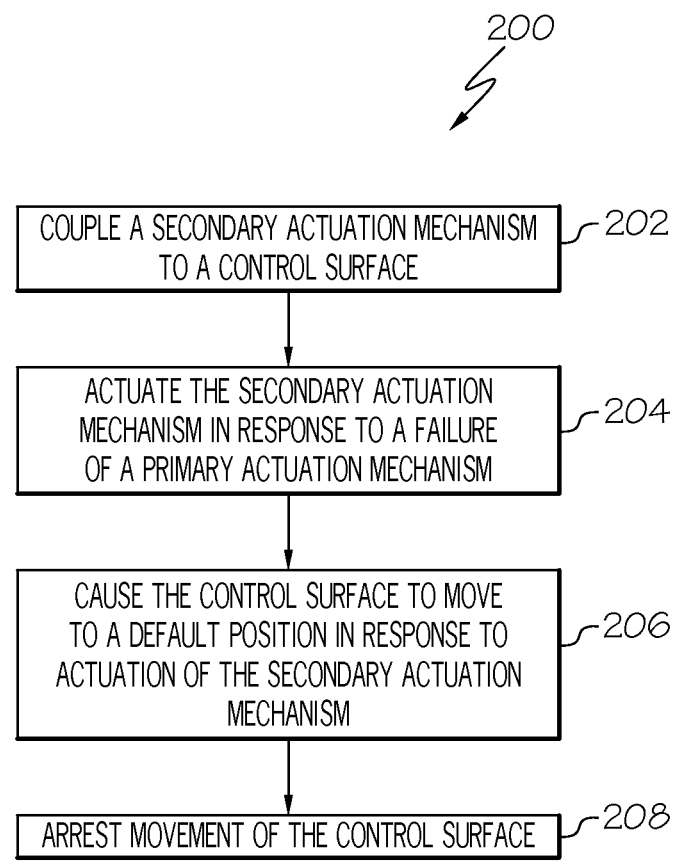
FIG. 11 is a flow diagram of one embodiment of the disclosed method for arresting movement of a control surface.

Referring to FIG. 11, and with reference to FIGS. 4 and 7, one embodiment of the disclosed method, generally designated 200, for arresting movement of a control surface may include coupling the secondary actuation mechanism 50 to the control surface 22, as shown at block 202. As shown at block 204, the secondary actuation mechanism 50 may actuate in response to a failure of the primary actuation mechanism 36. As shown at block 206, the secondary actuation mechanism 50 may cause the control surface 22 to move to a default position in response to actuation of the secondary actuation mechanism 50. As shown at block 208, the secondary actuation mechanism 50 may arrest movement of the control surface 22.

Figure 12:
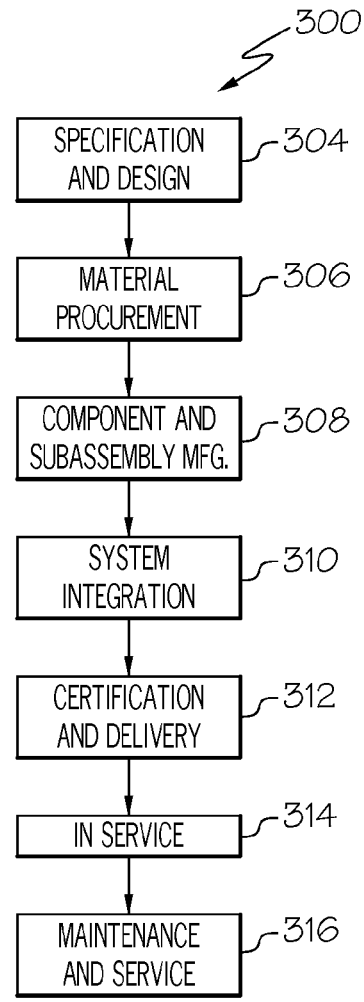
FIG. 12 is flow diagram of one embodiment of an aircraft production and service methodology.
Figure 13:
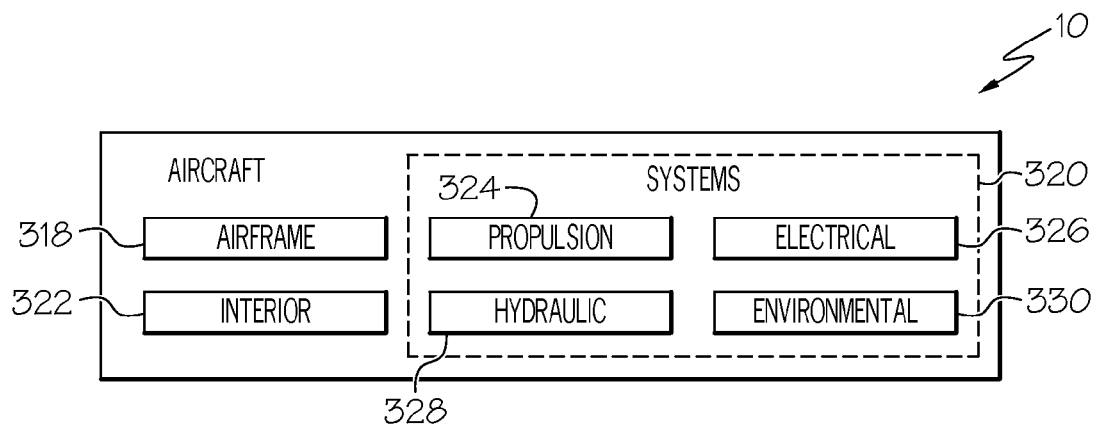
FIG. 13 is a block diagram of one embodiment of the aircraft of FIG. 1.

Examples of the disclosure may be described in the context of an aircraft manufacturing and service method 300, as shown in FIG. 12, and the aircraft 10, as shown in FIG. 13. During pre-production, the aircraft manufacturing and service method 300 may include specification and design 304 of the aircraft 10 and material procurement 306. During production, component/subassembly manufacturing 308 and system integration 310 of the aircraft 10 takes place. Thereafter, the aircraft 10 may go through certification and delivery 312 in order to be placed in service 314. While in service by a customer, the aircraft 10 is scheduled for routine maintenance and service 316, which may also include modification, reconfiguration, refurbishment and the like.

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 10 produced by example method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosed secondary actuation mechanism 50 and method 200 may be applied to other industries, such as the automotive and marine industries.

Apparatus and methods embodied herein may be employed during any one or more of the stages of the production and service method 300. For example, components or subassemblies corresponding to component/subassembly manufacturing 308, system integration 310, and or maintenance and service 316 may be fabricated or manufactured using the disclosed secondary actuation mechanism 50. Also, one or more apparatus examples, method examples, or a combination thereof may be utilized during component/subassembly manufacturing 308 and/or system integration 310, for example, by substantially expediting assembly of or reducing the cost of the aircraft 10, such as the airframe 318. Similarly, one or more of apparatus examples, method examples, or a combination thereof may be utilized while the aircraft 10 is in service, for example and without limitation, to maintenance and service 316.

Although various embodiments of the disclosed aircraft and secondary actuation mechanism have been shown and described, modifications may occur to those skilled in the art upon reading the specification. The present application includes such modifications and is limited only by the scope of the claims.

What is claimed is:

1. A secondary actuation mechanism for arresting movement of a control surface, said secondary actuation mechanism comprising:
   a secondary actuator;
   a drive link coupled to said secondary actuator; and
   a secondary connecting rod coupled between said drive link and said control surface,
   wherein:
      said control surface is movable to a default position in response to actuation of said secondary actuator,
      said secondary actuator retains said control surface at said default position, and
      said secondary actuator is smaller than a primary actuator.

2. The secondary actuation mechanism of claim 1 wherein said secondary actuator comprises a unidirectional actuator.

3. The secondary actuation mechanism of claim 1 wherein said secondary actuator comprises a pyrotechnic actuator.

4. The secondary actuation mechanism of claim 1 wherein:
   said secondary actuator comprises an actuation element,
   said actuation element is movable from a first position to a second position in response to said actuation of said secondary actuator,
   said secondary connecting rod is movable from a first position to a second position in response to movement of said actuation element to said second position, and
   said control surface is movable to said default position in response to movement of said secondary connection rod to said second position.

5. The secondary actuation mechanism of claim 4 wherein said drive link comprises a motion control feature configured to translate movement of said actuation element from said first position to said second position into movement of said secondary connecting rod from said first position to said second position.

6. The secondary actuation mechanism of claim 4 wherein said drive link comprises a motion control feature configured to allow movement of said secondary connection rod between a third position and a fourth position in response to movement of said control surface between a first position and a second position without applying a back-driving force to said actuation element.

7. The secondary actuation mechanism of claim 4 wherein:
   said drive link comprises:
      a first drive linkage comprising a first end and an opposed second end; and
      a second drive linkage comprising a first end and an opposed second end,
   said first end of said first drive linkage is coupled to said actuation element,
   said first end of said second drive linkage is coupled to said secondary connecting rod, and
   said second end of said first drive linkage and said second end of said second drive linkage are coupled together at a pivot connection.

8. The secondary actuation mechanism of claim 7 wherein:
said second drive linkage is movable between a first position and a second position in response to movement of said secondary connecting rod between a third position and a fourth position, and
said first drive linkage is not movable in response to movement of said second drive linkage between said first position and said second position.

9. The secondary actuation mechanism of claim 7 wherein:
said first drive linkage is movable from a first position to a second position in response to movement of said actuation element to said second position,
said second drive linkage is movable from a third position to a fourth position in response to movement of said first drive linkage to said second position, and
said secondary connecting rod is movable to said second position in response to movement of second drive linkage to said fourth position.

10. The secondary actuation mechanism of claim 7 wherein:
said first drive linkage comprises a first edge proximate said second end,
said second drive linkage comprises a second edge proximate said second end,
a space is defined between said first edge and said second edge.

11. The secondary actuation mechanism of claim 10 wherein:
said second drive linkage is movable between a first position and a second position in response to movement of said secondary connecting rod between a third position and a fourth position, and
said space is configured to allow movement of said second drive linkage between said first position and said second position.

12. The secondary actuation mechanism of claim 10 wherein:
said first drive linkage is movable from a first position to a second position in response to movement of said actuation element to said second position,
said first edge and said second edge engage in response to movement of said first drive linkage to said second position, and
said second drive linkage is movable from a third position to a fourth position in response to engagement of said first edge and said second edge.

13. An aircraft comprising:
at least one control surface;
a primary actuation mechanism coupled to said control surface, said primary actuation mechanism comprising a primary actuator; and
a secondary actuation mechanism coupled to said control surface, said secondary actuation mechanism comprising a secondary actuator comprising an actuation element, said secondary actuator being smaller than said primary actuator,
wherein:
said control surface is movable between a first position and a second position in response to actuation of said primary actuation mechanism,
said control surface is movable to a default position in response to actuation of said secondary actuation mechanism,
said secondary actuation mechanism actuates in response to a failure of said primary actuation mechanism, and
said secondary actuator retains said control surface at said default position.

14. The aircraft of claim 13 wherein said secondary actuation mechanism does not apply a load to said primary actuation mechanism in response to movement of said control surface between said first position and said second position.

15. The aircraft of claim 13 wherein:
said primary actuation mechanism further comprises:
a primary connecting rod coupled between said primary actuator and said control surface,
said secondary actuation mechanism further comprises:
a drive link coupled to said actuator element; and
a secondary connecting rod coupled between said drive link and said control surface,
said primary connecting rod is movable between a first position and a second position in response to actuation of said primary actuator,
said control surface is movable between said first position and said second position in response to movement of said primary connecting rod between said first position and said second position,
said secondary connecting rod is movable from a first position to a second position in response to actuation of said secondary actuator, and
said control surface is movable to said default position in response to movement said secondary connecting rod to said second position.

16. The aircraft of claim 15 wherein:
said actuation element is movable from a first position to a second position in response to said actuation of said secondary actuator,
said secondary connecting rod is movable to said second position in response to movement of said actuation element to said second position,
said drive link comprises a motion control feature configured to translate movement of said actuation element from said first position to said second position into movement of said secondary connecting rod from said first position to said second position.

17. The aircraft of claim 15 wherein:
said secondary connecting rod is movable between a third position and a fourth position in response to movement of said control surface between said first position and said second position, and
said drive link comprises a motion control feature configured to allow movement of said secondary connection rod between said third position and said fourth position without applying a back-driving force to said actuation element.

18. The secondary actuation mechanism of claim 15 wherein:
said drive link comprises:
a first drive linkage comprising a first end and an opposed second end; and
a second drive linkage comprising a first end and an opposed second end,
said first end of said first drive linkage is coupled to said actuation element,
said first end of said second drive linkage is coupled to said secondary connecting rod, and
said second end of said first drive linkage and said second end of said second drive linkage are coupled together at a pivot connection.

19. The aircraft of claim 18 wherein:
said secondary connecting rod is movable between a third position and a fourth position in response to movement of said control surface between said first position and said second position
said second drive linkage is movable between a first position and a second position in response to movement of said secondary connecting rod between said third position and said fourth position,
said first drive linkage is not movable in response to movement of said second drive linkage between said first position and said second position,
said actuation element is movable from a first position to a second position in response to said actuation of said secondary actuator,
said first drive linkage is movable from a first position to a second position in response to movement of said actuation element to said second position,
said second drive linkage is movable from a third position to a fourth position in response to movement of said first drive linkage to said second position, and
said secondary connecting rod is movable to said second position in response to movement of second drive linkage to said fourth position.

\* \* \* \* \*